United States Patent
Neumann et al.

(10) Patent No.: US 8,757,417 B2
(45) Date of Patent: Jun. 24, 2014

(54) CONTAINER COMPRISING A SEALING ELEMENT

(75) Inventors: Hans-Jürgen Neumann, Rüsselsheim (DE); Stephan Schlicht, Nauheim (DE); Christoph Schiel, Bad Nauheim (DE)

(73) Assignee: Continental Teves AG & Co. oHG (DE)

( * ) Notice: Subject to any disclaimer, the term of this patent is extended or adjusted under 35 U.S.C. 154(b) by 1060 days.

(21) Appl. No.: 12/307,954

(22) PCT Filed: May 10, 2007

(86) PCT No.: PCT/EP2007/054536
§ 371 (c)(1),
(2), (4) Date: Jan. 8, 2009

(87) PCT Pub. No.: WO2008/006632
PCT Pub. Date: Jan. 17, 2008

(65) Prior Publication Data
US 2009/0291628 A1    Nov. 26, 2009

(30) Foreign Application Priority Data

Jul. 11, 2006   (DE) .......................... 10 2006 031 931
Sep. 29, 2006   (DE) .......................... 10 2006 046 479

(51) Int. Cl.
*B65D 51/16*    (2006.01)

(52) U.S. Cl.
USPC .......................... 220/361; 220/367.1; 215/307

(58) Field of Classification Search
USPC .......... 220/361, 501, 203.27, 203.29, 203.01, 220/368, 374, 366.1, 367.1; 215/307; 454/237
See application file for complete search history.

(56) References Cited

U.S. PATENT DOCUMENTS

| | | | | |
|---|---|---|---|---|
| 3,454,183 A | * | 7/1969 | Fuchs | 220/303 |
| 4,337,875 A | * | 7/1982 | Lyons | 220/368 |
| 4,666,057 A | | 5/1987 | Côme et al. | |
| 5,152,419 A | * | 10/1992 | Yanagi | 220/374 |
| 6,360,540 B1 | | 3/2002 | Kottmyer | |
| 2002/0056695 A1 | | 5/2002 | Boulange et al. | |

FOREIGN PATENT DOCUMENTS

| | | |
|---|---|---|
| DE | 37 28 542 A1 | 3/1989 |
| DE | 37 34 421 A1 | 4/1989 |
| FR | 2 581 039 | 10/1986 |
| JP | 11-227594 | 8/1999 |

* cited by examiner

*Primary Examiner* — Jeffrey Allen
(74) *Attorney, Agent, or Firm* — RatnerPrestia

(57) ABSTRACT

A pressure medium container for hydraulic motor vehicle braking systems, with at least one chamber which can be filled with a liquid medium via a filler neck, and with a cover which can be fastened to the filler neck and has means for equalizing the pressure between the chamber and the atmosphere, wherein a sealing element is provided to prevent the liquid medium from emerging from the chamber. The sealing element has a space exposed to the atmosphere and has one or more openings facing the chamber, the space being configured such that liquid medium penetrating the space undergoes an increase in surface area, while its volume remains constant, when displaced by means of a further gaseous medium, and, when a threshold surface tension is reached, the liquid medium is forced back into the chamber such that the gaseous medium can flow into the atmosphere via the sealing element.

10 Claims, 3 Drawing Sheets

CONTAINER COMPRISING A SEALING ELEMENT

CROSS REFERENCE TO RELATED APPLICATIONS

This application is the U.S. national phase application of PCT International Application No. PCT/EP2007/054536, filed May 10, 2007, which claims priority to German Patent Application No. DE 10 2006 031 931.1, filed Jul. 11, 2006 and German Patent Application No. DE 10 2006 046 479.6, filed Sep. 29, 2006, the contents of such applications being incorporated by reference herein.

BACKGROUND OF THE INVENTION

1. Field of the Invention

The invention relates to a container, in particular to a pressure medium container for hydraulic motor vehicle braking systems, with at least one chamber which can be filled with a liquid medium via a filler neck, and with a cover which can be fastened to the filler neck and has means for equalizing the pressure between the chamber and the atmosphere, wherein a sealing element is provided to prevent the liquid medium from emerging from the chamber.

2. Description of the Related Art

Containers having active sealing elements, such as, for example, valves or membranes, or having passive sealing elements, such as, for example, labyrinths, which generally function on the basis of gravity, are generally known from all technical fields.

A container of the type in question, which is provided as a pressure medium container for a hydraulic vehicle braking system, is known, for example, from DE 37 34 421 A1. The sealing element of said container comprises a plurality of components which serve to seal the pressure medium chamber and at the same time permit the pressure to be equalized. For the functioning of a container of this type, the chamber in which the liquid medium, here the brake fluid as the pressure medium, is located has to be unpressurized. That is to say, the pressure between the chamber and the atmosphere can be equalized.

The container is therefore briefly ventilated and aerated once in each case during a braking operation, with said intermittent flows having to be ensured with adequate sealing. Furthermore, changes to the volume of the pressure medium, which may occur, for example, because of a loss of pressure medium or changes to the temperature of the pressure medium, have to be able to be compensated for by an exchange of air.

When the container is used in a braking system having a movement dynamics control system, such as, for example, electronic stability control (ESP), it may be necessary, during a control intervention, with the main cylinder of the braking system unactuated or actuated, to suck pressure medium out of the container in the direction of the wheel brakes, which takes place by means of a pressure medium conveying device, the input of which can be connected either to pressure spaces of the main cylinder or to the wheel brakes in order to convey in the direction of the wheel brakes or in the direction of the main cylinder.

At the same time, however, pressure medium should be prevented from being able to emerge from the pressure medium container—for example if the motor vehicle is in an oblique position. An exemplary embodiment can thus be found in DE 37 34 421 A1, in which a seal is arranged between the filler neck and the cover and a separating element is provided in a filling opening of the filler neck, said separating element being of air-permeable, but liquid-tight design, with the separating element being connected captively to the cover.

Furthermore, DE 10 2005 009 657 A1 discloses a container with a labyrinth.

Drawbacks of the abovementioned containers include the complicated construction and the time-consuming and costly installation. Furthermore, in the known containers use is frequently made of components and sealing elements which are produced from rubber-like materials or require a high degree of accuracy, which often leads to cost-intensive solutions.

SUMMARY OF THE INVENTION

In view of the foregoing it is therefore an object of the present invention to provide a container with a sealing element, which can be produced simply and cost-effectively, with it being necessary for the ventilation and aeration to be ensured with adequate sealing.

This object is achieved in that the sealing element has a space which is connected to the atmosphere and which has one or more openings facing the chamber, the space being configured in such a manner that liquid medium penetrating the space undergoes an increase in the surface, while the volume is retained, when displaced by means of a further gaseous medium, and, when a threshold surface tension is reached, the liquid medium is forced back into the chamber such that the gaseous medium can flow into the atmosphere via the sealing element. The container is therefore sealed simply and solely via the sealing element, with the cohesion or adhesion of the liquid medium being used and with it being possible to obtain a sealing action, even for highly viscous media, with adequate ventilation. Further sealing components are not necessary.

According to an advantageous development of the invention, the space extends in the axial direction with respect to a center axis of the container, as a result of which the sealing element can be produced simply and cost-effectively.

By contrast, a further advantageous embodiment of the invention, which permits a particularly flat construction of the sealing element, provides that the space extends in the radial direction with respect to a center axis of the container.

It is likewise conceivable for the space to advantageously have a curved shape.

A simple connection between the cover and sealing element is obtained in that the sealing element has a radially inwardly directed projection by means of which the sealing element can be fastened to the cover. This makes it possible for the sealing element to be fastened simply and rapidly in the cover. In this case, it is likewise advantageous for the cover and the sealing element to be able to form a unit which can be preassembled.

Furthermore, a particularly simple and cost-effective embodiment of the sealing element is produced in that the space is in the form of a funnel, the first narrowed end of which, at which the openings are provided, extends in the direction of the chamber.

According to an advantageous development of the invention, the radially inwardly directed projection of the sealing element is provided at a second end of the funnel. As a result, a large opening angle of the funnel can be provided, and a flat configuration of the sealing element is produced.

The emergence of the liquid medium out of the chamber is made more difficult in that, on an outer side of the funnel, the sealing element has a peripheral projection which is directed axially towards the chamber and protrudes over the funnel.

In order to improve the ventilation and aeration of the container during extreme oblique positions of the container, in the region of the funnel the sealing element has further openings which are provided outside the axial projection and are distributed uniformly over the circumference of the funnel. This ensures that air can always be exchanged via one of the openings of the sealing element.

Simple positioning of the sealing element on the filler neck is achieved by one or more concentrically encircling sealing lips for sealing the filler neck being integrally formed on the sealing element.

A method according to aspects of the invention for ventilating and aerating a container comprising a cover and a sealing element, wherein the container stores a liquid medium in at least one chamber, provides that the medium which penetrates the sealing element is displaced by a further gaseous medium, and that the surface of the medium is increased, with the volume being retained, when the liquid medium is displaced, with, when a threshold surface tension is reached, the medium being forced back into the chamber and the gaseous medium being able to flow into the atmosphere via the sealing element.

These and other aspects of the invention are illustrated in detail by way of the embodiments and are described with respect to the embodiments in the following, making reference to the Figures.

BRIEF DESCRIPTION OF THE DRAWINGS

Further details, features and advantages of the invention emerge from the description below of three exemplary embodiments with reference to the attached schematic drawing, in which.

DETAILED DESCRIPTION OF THE PREFERRED EMBODIMENTS

Figure 1:
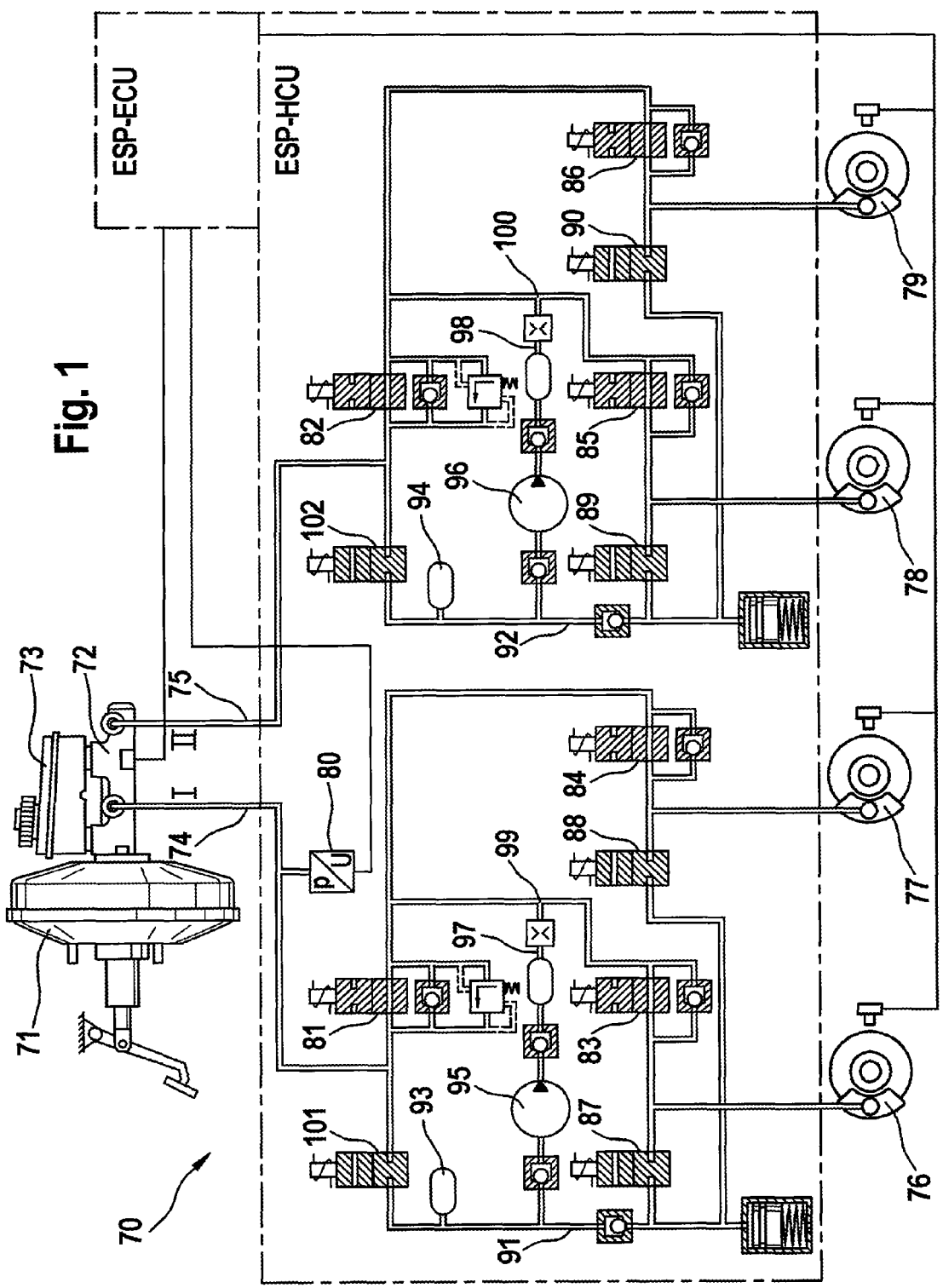
FIG. 1 shows the construction of a known electrohydraulic braking system having a movement dynamics control system.

FIG. 1 serves to explain an electrohydraulic braking system 70 which is known per se, is equipped here by way of example with an electronic stability control system (ESP) and in which use can be made of a container according to aspects of the invention from the exemplary embodiments below.

In principle, however, the use of the principle according to aspects of the invention is not restricted to a vehicle braking system or in general to automobile construction. A container according to aspects of the invention can conceivably be used in every technical field in which the use of a pressure-equalized container with a liquid medium is required.

The braking system 70 comprises a brake device with a pneumatic brake booster 71, and a pedal-actuable main cylinder 72 with an unpressurized pressure medium container 73, with pressure spaces (not illustrated) of the main cylinder 72 being connected to wheel brakes 76-79 via brake lines 74, 75. The wheel brakes 76-79 are combined in pairs in what are referred to as brake circuits I, II. In the brake circuits I, II, the "diagonal division" has been carried out combining diagonally opposite wheel brakes of the front axle and rear axle of a vehicle, with, in principle, a different division also being possible, such as, for example, the "black/white division" with a paired combination of the wheel brakes of an axle.

A pressure applied by the driver is sensed by a pressure sensor 80 on the brake line 74 which connects a pressure chamber of the main cylinder 72 to the wheel brakes 76, 77 of brake circuit I. Each brake line 74, 75 has electromagnetic separating valves 81, 82 in a series connection, and a respective inlet valve 83-86 and a respective outlet valve 87-90 for each wheel brake 76-79. The two wheel brakes 76, 77; 78, 79 of each brake circuit I, II are connected to a return line 91, 92, in the line branches of which the respective outlet valve 87-90 per wheel brake 76, 79 is inserted. Downstream of the outlet valves 87-90, each return line 91, 92 contains a low-pressure accumulator 93, 94 which is connected to an input of a pressure medium conveying device 95, 96 which is driven by electric motor, is configured, for example, as a pump and feeds the two brake circuits I, II. There is a hydraulic connection, by means of a pressure passage 97, 98 and a branch 99, 100, between an output of each pressure medium conveying device 95, 96 and the associated brake circuit I, II, with it being possible for the increase in pressure in the wheel brakes 76-79 to be regulated via the inlet valves 83-86. As a result, pressure can be applied via the pressure medium conveying devices 95, 96 to the wheel brakes 76-79, for the purpose of electronic stability interventions or for braking, without having to make recourse to a central high-pressure accumulator as in the case of electrohydraulic braking systems. In order to permit a change between the ABS return mode (conveying direction in the direction of the main brake cylinder 72) and the ASR or ESP movement dynamics control mode (conveying direction in the direction of the wheel brakes) by means of the pressure medium conveying devices 95, 96, a respective switchover valve 101, 102 is integrated in the suction branch of each pressure medium conveying device 95, 96, which switchover valve is capable of producing a pressure medium connection between the main cylinder 72 and the input of the pressure medium conveying devices 95, 96 when the movement dynamics control system is active.

Figure 2:
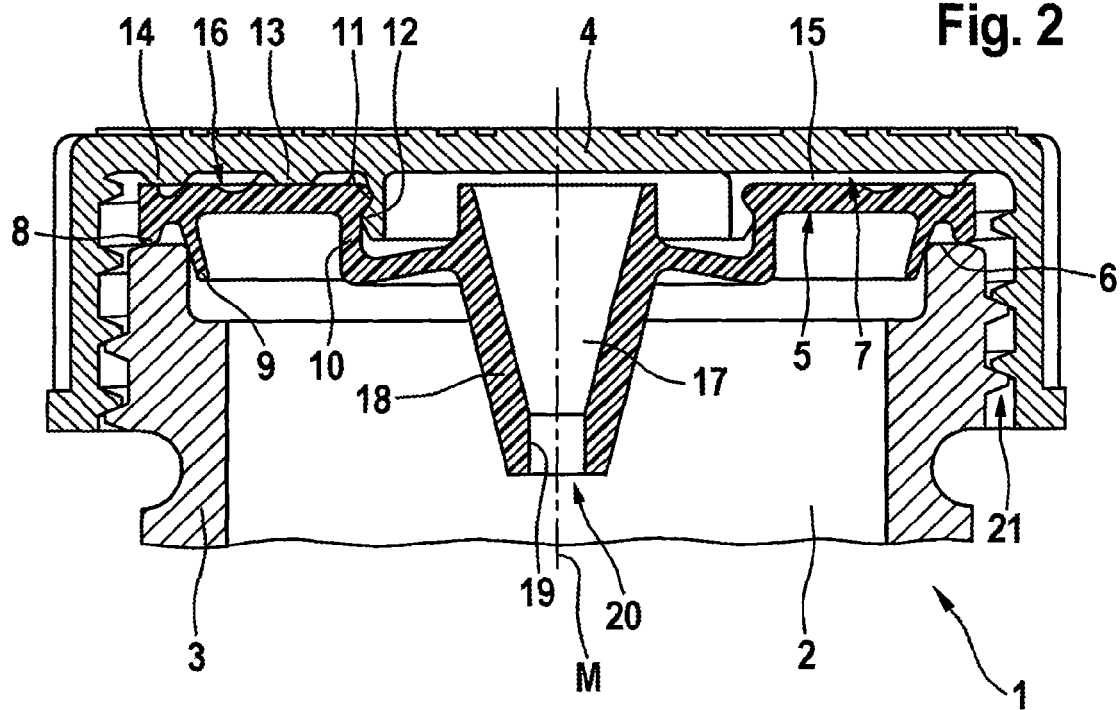
FIG. 2 shows a detail of a first exemplary embodiment of a container according to aspects of the invention in longitudinal section.

FIG. 2 shows a detail of a first exemplary embodiment of a container 1 according to aspects of the invention in longitudinal section, which container can be used, for example, as a pressure medium container 73 in a braking system which is described according to FIG. 1 and has a movement dynamics control system.

When used in a hydraulic braking system, the container 1 provides brake fluid as the pressure medium for a braking system in at least one chamber 2. As can be seen from FIG. 1, the container 1 is fastened to the main cylinder 72 and is connected thereto. The container 1 has a filler neck 3 via which the container 1 can be filled with brake fluid and which can be closed by means of a cover 4. The cover 4 can be fastened, as illustrated in FIG. 2, to the filler neck 3 via a threaded connection or alternatively via a bayonet connection.

For the operation of the container 1, the chamber 2 has to be unpressurized. This means that the pressure between the chamber 2 and the atmosphere has to be able to be equalized. The container 1 is thus briefly ventilated and aerated once in each case during a braking operation. Said intermittent flows have to be ensured with adequate sealing. Furthermore, changes in volume of the pressure medium, for example due to a loss of pressure medium or changes in the temperature of the pressure medium, have to be able to be compensated for by an exchange of air.

At the same time, pressure medium should be prevented from being able to emerge from the container 1, for example if the motor vehicle is in an oblique position. This is undertaken by means of a sealing element 5 which is provided from plastic and which is described in more detail below.

As is apparent, the sealing element 5 is of substantially disk-shaped design. The chamber 2 is sealed firstly by the sealing element 5 bearing against an edge 6 of the filler neck 3 and secondly by the sealing element 5 bearing against an inner side 7 of the cover 4.

The sealing at the edge 6 of the filler neck 3 takes place via two substantially axially oriented, concentrically encircling sealing lips 8, 9 of the sealing element 5, which sealing lips are integrally formed on the outer edge of the same. In this case, the inner sealing lip 9 projects in its length over the outer sealing lip 8 and is inclined by a certain angle with respect to a center axis M of the container 1 such that, after the cover 4 is installed on the filler neck 3, said inner sealing lip projects into the chamber 2 while simultaneously resting on the edge 6 of the filler neck 3. Simple positioning of the sealing element 5 on the filler neck 3 can therefore be achieved.

As emerges from FIG. 2, for the sealing of the sealing element 5, the cover 4, on its inner side 7, has concentrically encircling projections 13, 14 which, after the installation of the cover 4, bear against an upper side 16 of the sealing element 5 and are pierced only by an air duct 15 described further below.

To fasten the sealing element 5 to the cover 4, the sealing element 5 has, on an axial wall 10, a radially inwardly directed projection 11 by means of which the sealing element 5 is fastened to a corresponding, radially outwardly directed projection 12 of the cover 4. As a result, the sealing element 5 can be clipped simply and rapidly into the cover 4, and the two components 4, 5 can form a unit which can be preassembled.

Figure 3:
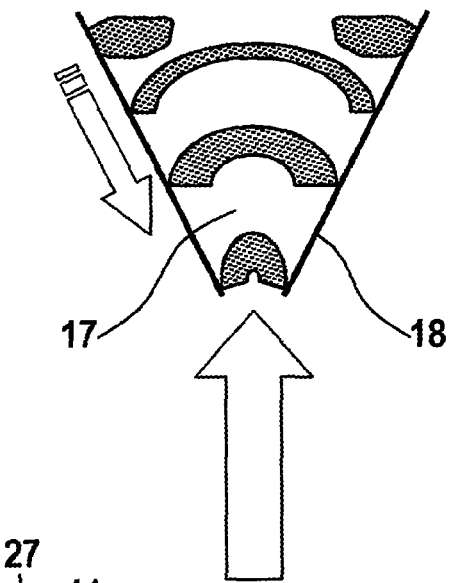
FIG. 3 shows an operational sketch of the sealing element.

For the ventilation and aeration of the chamber 2, the sealing element 5 has a space 17 which is connected to the atmosphere. As is apparent from FIG. 2, the space 17 is formed by a wall in the form of a funnel 18, the first narrowed end 20 of which extends in the direction of the chamber 2. An opening 19 which connects the space 17 to the chamber 2 is provided at the first end 20 of the funnel 18. The function of the space 17 is explained with reference to the operational sketch according to FIG. 3.

If, for example, by pressure medium being returned to the chamber 2, a positive pressure is produced, the latter has to be reduced, i.e. the pressure between the chamber 2 and the atmosphere has to be equalized. In the process, a small amount of pressure medium may penetrate the space 17 via the opening 18. On account of the positive pressure of the air located in the chamber 2, the pressure medium is displaced in the space 17 in the direction of the cover 4 in a manner similar to a bubble, with the pressure medium undergoing an increase of its surface, while its volume is maintained, because of cohesion and adhesion. The pressure medium is displaced further in the direction of the cover 4 by the positive pressure until a threshold surface tension of the pressure medium is reached and the bubble of pressure medium bursts. By means of adhesion and a capillary action, the pressure medium is forced back along the funnel 18 into the chamber 2, and the air can flow into the atmosphere via the space 17.

Cost effective production of the container 1 without a complicated injection mold is possible by extending the space 17 in the axial direction with respect to the center axis M of the container 1. However, it is also conceivable for the space 17 to extend in the radial direction with respect to the center axis M, or for said space to have a curved shape, with both shapes permitting a particularly flat configuration of the sealing element 5. These configuration options are only mentioned by way of example, since the surface can be increased along any path. The pressure medium is also forced back largely independently of acceleration forces, for example gravity. Furthermore, it is advantageous for the sealing element 5 to have direction-dependent throughflow resistances such that the pressure medium can more easily flow through the opening 19 in the direction of the chamber 2 than in the direction of the cover 4.

Air between the space 17 and the atmosphere is exchanged via the above-described air duct 15 in the cover 4 and via recesses (not shown) in the threaded connection 21 between the cover 4 and filler neck 3.

Figure 4:
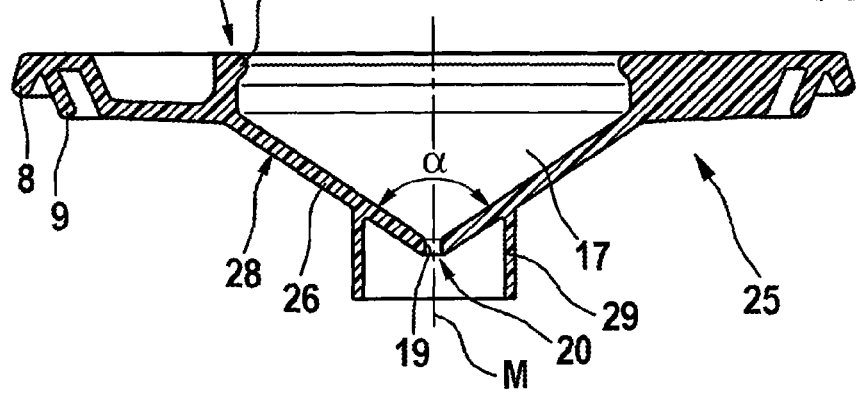
FIG. 4 shows a sealing element of a second exemplary embodiment of a container according to aspects of the invention in longitudinal section.

FIG. 4 shows a sealing element 25 of a second exemplary embodiment of a container according to aspects of the invention in longitudinal section. Said sealing element 25 differs from the sealing element 5 of the first exemplary embodiment in the configuration of the funnel, and therefore this is all that is discussed in the description below. The same parts of the sealing elements 5, 25 are provided with the same reference numbers and a description thereof is not repeated.

As is apparent from FIG. 4, the radially inwardly directed projection 11 for fastening the sealing element 25 to the cover 4 is provided at a second end 27 of the funnel 26, since, in this exemplary embodiment, the wall 10 which is shown in FIG. 2 is designed as part of the funnel 26. As a result, a large opening angle $\alpha$ of the funnel 26 can be provided, and the sealing element 25 can be of very flat configuration.

In order to continue to make it difficult for the pressure medium to emerge from the chamber 2, a peripheral projection 29 which is directed axially in the direction of the chamber 2 is provided on an outer side 28 of the funnel 26, said projection surrounding the first end 20 of the funnel 26 and protruding over the funnel 26.

Figure 5:
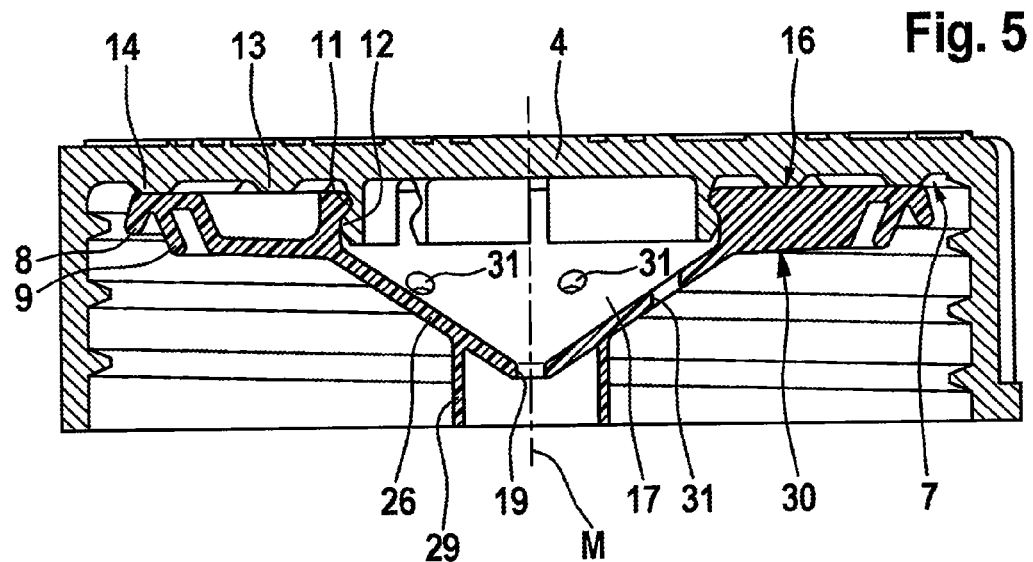
FIG. 5 shows a detail of a third exemplary embodiment of a container according to aspects of the invention in longitudinal section.
Figure 6:
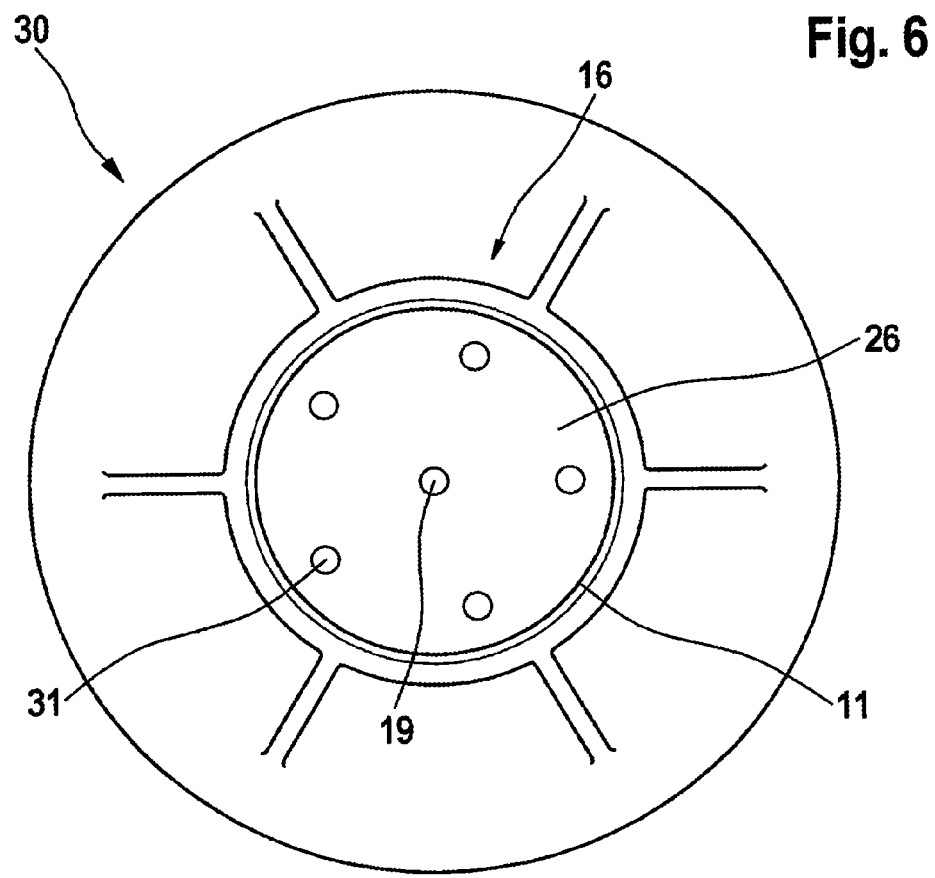
FIG. 6 shows the sealing element of the third exemplary embodiment in a top view.

FIG. 5 shows a detail of a third exemplary embodiment of a container 1 according to aspects of the invention in longitudinal section. The sealing element 30 of this exemplary embodiment differs only slightly from the sealing element 25 of the second exemplary embodiment according to FIG. 4. In order to improve the ventilation and aeration of the container 1 during extreme oblique positions of the vehicle, in the region of the funnel 26 the sealing element 30 has further openings 31 which are provided outside the axial projection 29 and are distributed uniformly over the circumference of the funnel 26. This is revealed in particular in FIG. 6 which shows a plan view of the upper side 16 of the sealing element 30. The additional openings 31 ensure that, even in the case of extreme oblique positions of the container 1, air can always be exchanged via one of the openings 31 of the sealing element 30.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A container comprising:
   at least one chamber which can be filled with a liquid medium through a filler neck;
   a cover which is configured to be fastened to the filler neck;
   means for equalizing the pressure between the chamber and the atmosphere;

a unitary sealing element that is configured to prevent the liquid medium from emerging from the chamber, wherein the unitary sealing element includes a funnel-shaped element defining a space which is exposed to the atmosphere and has one or more holes facing the chamber, and first and second concentrically encircling projections on an underside surface of the cover, wherein each of the first and second encircling projections is interrupted by a gap, wherein after the installation of the cover, the first and second encircling projections bear against an upper side of the sealing element and the gaps that are formed in the first and second encircling projections together form an air duct for the passage of air out of the container, a third encircling projection on an underside surface of the cover that is configured to be fastened to the sealing element and is spaced radially inwardly from the first and second concentrically encircling projections, wherein the funnel-shaped element includes a narrowed end extending in a direction of the chamber at which the holes are provided, wherein the unitary sealing element has a peripheral projection on an outer side of the funnel-shaped element that is positioned at a location adjacent the one or more holes which is directed axially towards the chamber and projects over the one or more holes such that the peripheral projection is positioned at a lower elevation within the chamber than the one or more holes, and wherein the space is configured such that liquid medium penetrating the space undergoes an increase in its surface area while its volume remains substantially constant when displaced by means of a gaseous medium, and, the liquid medium is urged back into the chamber such that the gaseous medium can flow into the atmosphere through the unitary sealing element when a threshold surface tension of the liquid medium is reached.

2. The container as claimed in claim 1, wherein the space extends in the axial direction with respect to a center axis (M) of the container.

3. The container as claimed in claim 1, wherein the space extends in the radial direction with respect to a center axis (M) of the container.

4. The container as claimed in claim 2, wherein the space has a curved shape.

5. The container as claimed in claim 1, wherein the sealing element includes holes in the region of the funnel which are provided outside the peripheral projection and are distributed uniformly over the circumference of the funnel.

6. The container as claimed in claim 1 further comprising one or more concentrically encircling sealing lips for sealing the filler neck that are integrally formed on the sealing element.

7. The container as claimed in claim 1, wherein the container is a pressure medium container for hydraulic motor vehicle braking systems.

8. A method for ventilating and aerating a container comprising a cover and a sealing element as claimed in claim 1, wherein the container stores the liquid medium in at least one chamber, wherein the liquid medium which penetrates the sealing element is displaced by the gaseous medium, and wherein the surface area of the fluid medium is increased while the volume of the liquid medium remains substantially constant when the liquid medium is displaced, and wherein when a threshold surface tension of the fluid medium is reached, the fluid medium is forced back into the chamber thereby enabling the gaseous medium to flow into the atmosphere though the sealing element.

9. The container as claimed in claim 1 wherein multiple holes are distributed uniformly over a circumference of the funnel-shaped element.

10. The container as claimed in claim 1 wherein the peripheral projection is radially spaced from the one or more holes.

* * * * *